3,574,834
MEDICINAL SOPORIFIC COMPOSITION
Samuel Kuna, Westfield, N.J., assignor to
Merck & Co., Inc., Rahway, N.J.
No Drawing. Filed Apr. 30, 1969, Ser. No. 820,669
Int. Cl. A61k 27/00
U.S. Cl. 424—235                         3 Claims

ABSTRACT OF THE DISCLOSURE

A soporific pharmaceutical composition containing from 160 to 2600 mg. of salicylamide and from ⅓ to equal that amount (preferably ½) of glyceryl guaiacolate, and if desired, an effective amount of a drowsiness inducing antihistamine.

---

This invention relates to medicinal soporific preparations and particularly to a combination of known therapeutic agents which have a potentiated sleep producing effect.

The human need for an adequate amount of sleep is well known. Protracted loss of sleep induces fatigue and nervousness and as these conditions serve to react against sleep a vicious circle tends to be established. A sufficient amount of daily sleep is therefore essential to a feeling of well-being. Without its restorative function, persons find it hard to work or concentrate and they become apprehensive about their ability to go about their daily tasks. The restlessness which results can lead to a high degree of irritability, worry and sometimes a frightening bewilderment.

The need for a safe and effective soporific is self-evident. It is needed to overcome the tendency of insomniacs to fight sleep and to restore a general repeating pattern of sleep. After sleep of a natural kind has been reestablished, the need for reliance on the soporific drug is often overcome.

The present invention provides an effective non-narcotic nonbarbiturate, nonbromide, pharmaceutic preparation which will overcome insomnia.

The invention involves the discovery that the slight soporific effect of salicylamide is potentiated by the joint administration with it of glyceryl guaiacolate. The conventional medical use of salicylamide is orally as an analgesic, antipyretic and/or antirheumatic and the usual dose is 650 milligrams orally every three or four hours while the need exists. Glyceryl guaiacolate, also known as guaiacol glyceryl ether, is sometimes used in cough remedies and has no known soporific effect.

The invention involves the discovery that the oral coadministration of one part by weight of salicylamide and from one-third to one part (preferably one-half) of glyceryl guaiacolate produces an unexpected soporific effect. The average single dose for human adults is 650 mg. of salicylamide, but the invention contemplates from 160 to 2600 mg. depending largely on the variations in human needs and whether the person is of slight build or is heavier than the average persons. The combination preparation may be taken in the form of capsules, tablets, elixirs and aqueous suspensions. Preferably, the two ingredients are combined in the proper ratio and weight in a single preparation but they may be taken separately such as by weighing out the separate powders and swallowing them separately with the aid of water.

If desired, other sleep producing drugs may be added to the combination but, of course, they may be omitted altogether. Thus, the antihistamines which are known to cause drowsiness may be included in the preparation or taken orally jointly with the salicylamide and glyceryl guaiacolate. Suitable antihistamines for this purpose are methapyrilene (10–50 mg. per dose), pyralamine (10–50 mg. per dose) and promethazine (10–50 mg. per dose).

A prior art preparation which is sold as a sedative contains 390 mg. of salicylamide, 100 mg. of glyceryl guaiacolate and 50 mg. of methapyriline. In this preparation the ratio between the salicylamide and glyceryl guaiacolate is 1 to .255; this is substantially less than the ratio of the present invention which, as stated above, is 1 to .33–1.0. The critical nature of this lower ratio of the invention to obtain the potentiated soporific effect is shown by the fact that the prior art preparation is relatively ineffective as a sleep producer. This is true irrespective of the presence or absence of methapyriline.

To make a comparative test between the prior art composition and the composition of the invention, the relative proportions of the prior art composition were maintained but the dosage of salicylamide was increased to 650 mg. and the amount of glyceryl guaiacolate was proportionately increased to 167 mg. and the amount of methapyriline maintained at 50 mg. This increased dosage of the prior art compound produced sleep in 20 of 55 mice and the sleeping ones slept for an average of 55 minutes. This was compared with the formulation of the invention which contained the same 650 mg. of salicylamide, the same 50 mg. methapyraline but an increased amount, namely 320 mg. of glyceryl guaiacolate. This latter formulation produced sleep in 31 of 55 mice and the sleeping ones slept an average of 75 minutes. This may be tabulated as follows, in which S represents salicylamide, GG represents glyceryl guaiacolate and M represents methapyrialine.

| Preparation | | | Sleep production | | Sleep duration | |
|---|---|---|---|---|---|---|
| S | G | M | Number | Percent | Minutes | Increase, percent |
| Prior art___ 650 | 167 | 50 | 20/55 | 56 | 55 | |
| Invention__ 650 | 320 | 50 | 31/55 | 75 | 75 | 36 |

This shows that an increase in the relative amount of glyceryl guaiacolate which per se has no soporific effect, serves to potentiate the soporific effect of salicylamide.

To determine the effect of the methapyraline, it was omitted from the prior art and the invention compositions and the following results on mice were obtained:

| Preparation | | | Sleep production | | Sleep duration | |
|---|---|---|---|---|---|---|
| S | G | M | Number | Percent | Minutes | Increase, percent |
| Prior art___ 650 | 167 | 0 | 21/30 | 70 | 51 | |
| Invention__ 650 | 320 | 0 | 25/30 | 83 | 76 | 49 |

This shows that the methapyraline is not essential to produce sleep.

Another test was performed to determine the essential need for the higher ratio of salicylamide to glyceryl guaiacolate which is the feature of this invention. This involved a comparison of equal weights of the prior art composition and the composition of the invention. The results on mice were:

| Preparation | | | Sleep production | | Sleep duration | |
|---|---|---|---|---|---|---|
| S | G | M | Number | Percent | Minutes | Increase, percent |
| Prior art [1]___ 650 | 167 | 83 | 4/10 | 50 | 16 | |
| Invention [1]__ 594 | 292 | 14 | 5/10 | 50 | 20 | 52 |

[1] 900 mg. total.

This test shows the importance of the above-mentioned higher ratio of the invention, i.e. 1 to ⅓–1.

EXAMPLES

A preferred example of the invention is a capsule containing 325 mg. of salicylamide and 162.5 mf. of glyceryl guaiacolate. Two of them would be swallowed at bedtime but one of them may prove to be sufficient, particularly for slight persons. On the other hand large persons or those requiring heavier doses may take three or even four capsules. Capsules can of course, be prepared to contain smaller or larger amounts, i.e. from 160 to 865 mg. of salicylamide and half that amount of glyceryl guaiacolate. From one to three of such capsules may be taken at bedtime.

Instead of capsules the above ingredients may be compressed into tablets using conventional granulation and tableting procedures.

Or, the ingredients may be put in an aqueous suspension employing conventional pharmaceutical practices. The concentration would be selected so that one to two fluid ounces would contain the amount of the drugs which are found to be necessary to overcome insomnia. This single dose may be from 160 to 2600 mg. of salicylamide and half that amount of glyceryl guaiacolate, but preferably 325 to 1300 mg.

Alcoholic elixir, similar to the aqueous preparation may as well be made up.

The above examples contain the preferred amount of half as much glyceryl guaiacolate as salicylamide, by weight. Other examples, in which the glyceryl guaiacolate is within the range of one-third to an equal amount of the weight of salicylamide are obvious and are included.

To the above examples of compositions of the invention may be added an antihistamine or any other drug which is compatible in the preparation and satisfies a therapeutic need. An illustration of this is the addition of 0.75–1.25% by weight of the selected antihistamine relative to the amount of salicylamide, using one of the above-mentioned or a known antihistamine which has a drowsiness inducing side reaction. Illustrative of the invention is the addition of at least an effective amount of a sleep inducing antihistamine; this may for instance be from 10 to 50 mg. per unit dose of one of the antihistamines specifically named above.

What is claimed is:

1. The method of overcoming insomia in an insomniac person which consists essentially of administering to said person from 160 to 2600 mg. of salicylamide and conjointly therewith from one-third to an equal amount of glyceryl guaiacolate.

2. The method according to claim 1 in which 325 to 1300 mg. is administered together with from one-third to an equal amount of glyceryl guaiacolate.

3. The method according to claim 1 in which 325 to 1300 mg. is administered together with half that amount of glyceryl guaiacolate.

References Cited

UNITED STATES PATENTS

| | | | |
|---|---|---|---|
| 3,140,228 | 7/1964 | Kuna et al. | 424—235 |
| 3,314,852 | 4/1967 | Green et al. | 424—340 |

STANLEY J. FRIEDMAN, Primary Examiner